(12) United States Patent
Visel et al.

(10) Patent No.: US 6,524,716 B2
(45) Date of Patent: Feb. 25, 2003

(54) METHOD FOR THE PREPARATION OF A DIENE POLYMER INTERPENETRATED WITH A POLYSILOXANE

(75) Inventors: Friedrich Visel, Bofferdange (LU); Wolfgang Lauer, Mersch (LU); Marc Weydert, Luxembourg (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/904,596

(22) Filed: Jul. 13, 2001

(65) Prior Publication Data

US 2002/0058755 A1 May 16, 2002

Related U.S. Application Data

(60) Provisional application No. 60/221,282, filed on Jul. 27, 2000.

(51) Int. Cl.$^7$ .................................................. B32B 9/04
(52) U.S. Cl. .................... 428/447; 524/268; 525/100; 525/105; 525/903; 528/14; 528/25; 528/33; 528/37
(58) Field of Search .............................. 528/14, 25, 33, 528/37; 525/100, 105, 903; 428/447; 524/268

(56) References Cited

U.S. PATENT DOCUMENTS

| | | | | |
|---|---|---|---|---|
| 3,041,362 A | * | 6/1962 | Mercker | 556/434 |
| 3,294,740 A | * | 12/1966 | McVannel | 528/14 |
| 4,276,402 A | * | 6/1981 | Chromecek et al. | 526/264 |
| 4,584,356 A | | 4/1986 | Crivello | 525/479 |
| 4,677,169 A | | 6/1987 | Crivello | 525/479 |
| 5,068,303 A | | 11/1991 | Bard et al. | 528/25 |
| 5,117,025 A | * | 5/1992 | Takago et al. | 556/434 |
| 5,242,979 A | | 9/1993 | Barnum et al. | 525/106 |
| 5,281,666 A | * | 1/1994 | Hoxmeier | 525/105 |
| 5,451,637 A | | 9/1995 | Leibfried | 525/105 |
| 5,561,210 A | | 10/1996 | Roy | 528/14 |
| 5,728,469 A | | 3/1998 | Mann et al. | 428/418 |
| 5,811,479 A | | 9/1998 | Labauze | 524/188 |
| 5,859,105 A | | 1/1999 | Nguyen | 524/404 |
| 6,080,829 A | * | 6/2000 | Tapsak et al. | 528/35 |
| 6,235,864 B1 | * | 5/2001 | Loy et al. | 528/35 |

OTHER PUBLICATIONS

"Phenylene–Bridges, cyclic Siloxanes as Precursors for Non-shrinking Sol–Gel Systems and Their Use as Capsule Material " by D. A. Loy et al., *Angew. Chem.*, 111 (4):515–516 (1999).

* cited by examiner

*Primary Examiner*—Margaret G. Moore
*Assistant Examiner*—Marc S. Zimmer
(74) *Attorney, Agent, or Firm*—Bruce J. Hendricks; John D. DeLong

(57) ABSTRACT

There is disclosed a method for the preparation of a diene polymer interpenetrated with a polysiloxane comprising the polymerization of (A) at least one silane monomer of the formula:

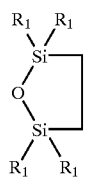

I (B) at least one silane monomer of the formula:

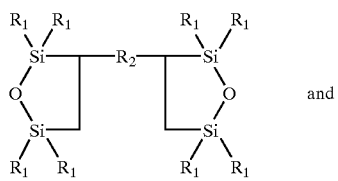

II and (C) at least one diene monomer, said polymerization being conducted in the presence of an anionic base, an inert solvent and a polymerization initiator, wherein each $R_1$ is independently selected from the group consisting of alkyl radicals having from 1 to 4 carbon atoms and aryl radicals having 6 carbon atoms and $R_2$ is selected from the group consisting of

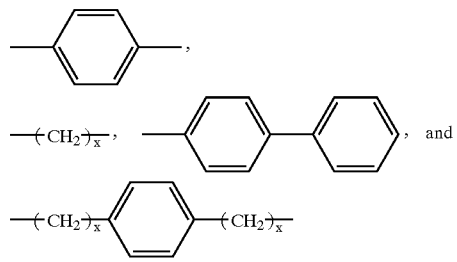

where x is an integer of from 1 to 8.

17 Claims, No Drawings

METHOD FOR THE PREPARATION OF A DIENE POLYMER INTERPENETRATED WITH A POLYSILOXANE

The Applicants hereby incorporate by reference prior U.S. Provisional Application Serial No. 60/221,282, filed on Jul. 27, 2000.

BACKGROUND OF THE INVENTION

U.S. Pat. No. 5,242,979 relates to a polymeric composition comprising a continuous phase and a discontinuous phase. The continuous phase comprises a crosslinked organosilicon polymer compound of alternating polycyclic hydrocarbon residues derived from polycyclic polyenes having at least two non-aromatic; non-conjugated carbon-carbon double bonds in their rings, and residues derived from the group consisting of cyclic polysiloxanes and tetrahedral siloxysilanes linked through carbon to silicon bonds. The discontinuous phase comprises a low molecular weight hydrocarbon elastomer having at least two hydrosilation reactable carbon-carbon double bonds. These products are formed by combining an existing elastomer with an organosilicon prepolymer. As such, there is a reaction between the prepolymer and elastomer to promote adhesion between the two separate phases. The preferred hydrocarbon elastomers have two or more hydrosilation reactable carbon-carbon double bonds, however, elastomers having large numbers of double bonds tend to react with the prepolymer as one phase systems. The elastomer is present in an amount of 0.5 to 20 percent by weight. The elastomer may be added to the prepolymer or during prepolymer synthesis.

SUMMARY OF THE INVENTION

The present invention relates to a diene polymer which is interpenetrated with a polysiloxane and is prepared by the simultaneous polymerization of at least two cyclic silane monomers and a diene monomer.

DETAILED DESCRIPTION OF THE INVENTION

There is disclosed a method for the preparation of a diene polymer interpenetrated with a polysiloxane comprising the polymerization of (A) at least one silane monomer of the formula:

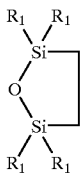

I (B) at least one silane monomer of the formula:

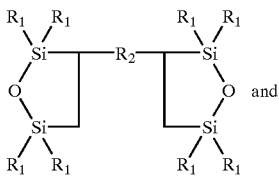

II (C) at least one diene monomer, said polymerization being conducted in the presence of an anionic base, an inert solvent and a polymerization initiator, wherein each $R_1$ is independently selected from the group consisting of alkyl radicals having from 1 to 4 carbon atoms and aryl radicals having 6 carbon atoms and $R_2$ is selected from the group consisting of

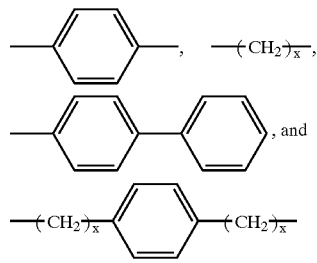

wherein x is an integer of from 1 to 8.

The silane monomers of formula I and/or II are subjected to a ring opening polymerization during the process of the present invention. Preferably, $R_1$ is an alkyl having one carbon atom

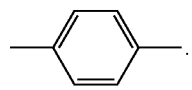

A commercially available cyclic silane of the above formula I, 2,2,5,5-tetramethyl-2,5-disila-1-oxacyclopentane is available from ABCR GmbH and Company.

Phenylene-bridged cyclic siloxanes are known precursors for non-shrinking sol-gel systems. See D. A. Loy, K. Rahimian, M. Samara, Angew. Chem. 111(4): 515 (1999). Such phenylene-bridged cyclic siloxanes are included in formula II.

The requirement for the ring-opening polymerization of the cyclic silane monomer of formula I and II is a catalytic quantity of an anionic base. Representative examples of such anionic bases include the organolithium compounds described later as well as tetrabutylammonium hydroxide, potassium phenoxide, sodium hydrogen sulfide, tertiary butoxide and potassium tertiary butoxide. Preferably, the anionic base is tetrabutylammonium hydroxide. The amount of the anionic base may vary. Generally speaking, the amount should range from 0.001 to 3 mol percent of the total percent of cyclic silanes charged into the polymerization medium.

As indicated above, at least one diene monomer is polymerized during the simultaneous ring opening polymerization of the two silanes of formula I and II. Representative examples of such diene monomers include butadiene, methylbutadiene, α-methylstyrene, paramethyl styrene, dimethylbutadiene, pentadiene, styrene, isoprene and mixtures thereof. The most preferred diene monomers are butadiene, styrene and isoprene.

As can be appreciated, depending on what monomer or monomers are used, one can introduce various diene polymers to be prepared simultaneously with the polysiloxane network. Therefore, the diene polymer may be polybutadiene, polyisoprene, styrene butadiene rubber, styrene-isoprene rubber, styrene-isoprene-butadiene rubber and isoprene-butadiene rubber.

The inert organic medium which is utilized as the solvent will typically be a hydrocarbon which is liquid at ambient temperatures which can be one or more aliphatics, alicyclic or aromatic hydrocarbons. These solvents will normally contain from 4 to 10 carbon atoms per molecule and will be liquids under the conditions of the polymerization. It is, of course, important for the solvent selected to be inert. The term "inert" as used herein means that the solvent does not interfere with the polymerization reactions or react with the polymers made thereby. Some representative examples of suitable organic solvents include pentane, isooctane, cyclohexane, normal hexane, benzene, toluene, xylene, ethylbenzene and the like, alone or in admixture. Saturated aliphatic solvents, such as cyclohexane and normal hexane, are most preferred.

The polymerization of the diene monomer is initiated by a lithium catalyst or initiator. The lithium catalysts which can be used are typically organolithium compounds. The organolithium compounds which are preferred can be represented by the formula R—Li, wherein R represents a hydrocarbyl radical containing from 1 to about 20 carbon atoms. Generally, such monofunctional organolithium compounds will contain from 1 to about 10 carbon atoms. Some representative examples of organolithium compounds which can be employed include methyllithium, ethyllithium, isopropyllithium, n-butyllithium, sec-butyllithium, n-octyllithium, tert-octyllithium, n-decyllithium, phenyllithium, 1-naphthyllithium, 4-butylphenyllithium, p-tolyllithium, 4-phenylbutyllithium, cyclohexyllithium, 4-butylcyclohexyllithium and 4-cyclohexylbutyllithium. Organo monolithium compounds, such as alkyllithium compounds and aryllithium compounds, are usually employed. Some representative examples of preferred organo monolithium compounds that can be utilized include ethyllithium, isopropyllithium, n-butyllithium, secondary-butyllithium, normal, hexyllithium, tertiary-octyllithium, phenyllithium, 2-naphthyllithium, 4-butylphenyllithium, 4-phenylbutyllithium, cyclohexyllithium and the like. Normal-butyllithium and secondary-butyllithium are highly preferred lithium initiators.

The amount of lithium catalyst utilized will vary from one organolithium compound to another and with the molecular weight that is desired for the rubber being synthesized. As a general rule in all anionic polymerizations, the molecular weight (Mooney viscosity) of the diene polymer produced is inversely proportional to the amount of catalyst utilized. As a general rule, from about 0.01 phm (parts per hundred parts by weight of diene monomer) to 1 phm of the lithium catalyst will be employed. In most cases, from 0.01 phm to 0.1 phm of the lithium catalyst will be employed with it being preferred to utilize 0.025 phm to 0.07 phm of the lithium catalyst. If the lithium catalyst is used as the anionic base for the ring opening polymerization, the amount of the catalyst must be increased as discussed above.

Normally, from about 5 weight percent to about 35 weight percent of the diene monomer will be charged into the polymerization medium (based upon the total weight of the polymerization medium including the organic solvent and monomer). In most cases, it will be preferred for the polymerization medium to contain from about 10 weight percent to about 30 weight percent monomer. It is typically more preferred for the polymerization medium to contain from about 20 weight percent to about 25 weight percent monomer.

After the initial charge of the diene monomer, the polymerization is initiated followed by partial addition of the two cyclic silanes. Thereafter, the three monomers, namely the diene monomer and two cyclic silanes, are continuously introduced to the reaction vessel as polymerization is occurring.

One object of the present invention is to prepare a diene polymer interpenetrated with a polysiloxane. To achieve this, one needs to use an excess of diene monomer relative to the amount of the two cyclic silanes. Whereas this amount may vary, generally speaking, there should be from 3 to 150 moles of diene monomer per mole of the two cyclic silanes combined. Preferably, there is used 5 to 25 moles of diene monomer per mole of the two cyclic silanes combined.

As discussed above, at least one silane of formula I and at least one silane of formula II is used. Whereas, the relative amount of each silane may vary the amount of the cyclic silanes of formula I should range from 99.5 to 75 mol percent of total cyclic silane with the balance of 0.5 to 25 mol percent of cyclic silane of formula II. Preferably, the cyclic silane of formula I is used in an amount ranging from 99 to 90 mol percent with the balance being the cyclic silane of formula II.

The monomers are polymerized at a temperature which is within the range of about 5° C. to about 100° C. The polymerization temperature will preferably be within the range of about 40° C. to about 90° C. for practical reasons and to attain the desired microstructure of the diene polymer. Temperatures within the range of about 60° C. to about 80° C. are most preferred. The microstructure of the diene rubber being prepared is somewhat dependent upon the polymerization temperature.

The polymerization is allowed to continue until essentially all of the diene monomer and cyclic silanes have been exhausted. In other words, the polymerization is allowed to run to completion. Since lithium catalyst is employed to polymerize the diene monomer, a living diene rubber is produced. The living diene rubber synthesized will have a number average molecular weight which is within the range of about 25,000 to about 700,000. The diene rubber synthesized will more typically have a number average molecular weight which is within the range of about 150,000 to about 400,000.

To increase the level of vinyl content of the diene polymer, the polymerization can be carried out in the presence of at least one polar modifier. Ethers and tertiary amines which act as Lewis bases are representative examples of polar modifiers that can be utilized. Some specific examples of typical polar modifiers include diethyl ether, di-n-propyl ether, diisopropyl ether, di-n-butyl ether, tetrahydrofuran, dioxane, ethylene glycol dimethyl ether, ethylene glycol diethyl ether, diethylene glycol dimethyl ether, diethylene glycol diethyl ether, triethylene glycol dimethyl ether, trimethylamine, triethylamine, N,N,N',N'-tetramethylethylenediamine, N-methyl morpholine, N-ethyl morpholine, N-phenyl morpholine and the like.

The modifier can also be a 1,2,3-trialkoxybenzene or a 1,2,4-trialkoxybenzene. Some representative examples of 1,2,3-trialkoxybenzenes that can be used include 1,2,3-trimethoxybenzene, 1,2,3-triethoxybenzene, 1,2,3-tributoxybenzene, 1,2,3-trihexoxybenzene, 4,5,6-trimethyl-1,2,3-trimethoxybenzene, 4,5,6-tri-n-pentyl-1,2,3-triethoxybenzene, 5-methyl-1,2,3-trimethoxybenzenes and 5-propyl-1,2,3-trimethoxybenzene. Some representative examples of 1,2,4-trialkoxybenzenes that can be used include 1,2,4-trimethoxybenzene, 1,2,4-triethoxybenzene, 1,2,4-tributoxybenzene, 1,2,4-tripentoxybenzene, 3,5,6-trimethyl- 1,2,4-trimethoxybenzene, 5-propyl-1,2,4-trimethoxybenzene and 3,5-dimethyl-1,2,4-trimethoxybenzene. Dipiperidinoethane, dipyrrolidinoethane, tetramethylethylene diamine, diethylene glycol, dimethyl ether and tetrahydrofuran are representative of highly preferred modifiers. U.S. Pat. No. 4,022,959 describes the use of ethers and tertiary amines as polar modifiers in greater detail.

The utilization of 1,2,3-trialkoxybenzenes and 1,2,4,-trialkoxybenzenes as modifiers is described in greater detail in U.S. Pat. No. 4,696,986. The teachings of U.S. Pat. Nos. 4,022,959 and 4,696,986 are incorporated herein by reference in their entirety. The microstructure of the repeat units which are derived from diene monomer is a function of the polymerization temperature and the amount of polar modifier present. For example, it is known that higher temperatures result in lower vinyl contents (lower levels of 1,2-microstructure). Accordingly, the polymerization temperature, quantity of modifier and specific modifier selected will be determined with the ultimate desired microstructure of the diene rubber being synthesized being kept in mind.

In cases where super-high vinyl polybutadiene rubber is being synthesized, a combination of a sodium alkoxide and polar modifier will normally be employed as the modifier system. A combination of a sodium alkoxide and polar modifier acts synergistically to increase the vinyl content of polybutadiene rubber synthesized in its presence. The utilization of this synergistic modifier system can also be employed advantageously in the synthesis of high vinyl polybutadiene rubber.

The sodium alkoxides which can be utilized in the catalyst system will normally be of the formula NaOR, wherein R is an alkyl group containing from about 2 to about 12 carbon atoms. The sodium metal alkoxide will typically contain from about 2 to about 12 carbon atoms. It is generally preferred for the sodium alkoxide to contain from about 3 to about 8 carbon atoms. It is generally most preferred for the sodium alkoxide to contain from about 4 to about 6 carbon atoms. Sodium t-amyloxide (sodium t-pentoxide) is a representative example of a preferred sodium alkoxide which can be utilized in the modifier systems of this invention.

The molar ratio of the sodium alkoxide to the polar modifier in the modifier system will normally be within the range of about 0.1:1 to about 10:1 and the molar ratio of the sodium alkoxide to the lithium initiator will normally be within the range of about 0.01:1 to about 20:1. It is generally preferred for the molar ratio of the sodium alkoxide to the polar modifier to be within the range of about 0.2:1 to about 5:1 and for the molar ratio of the sodium alkoxide to the lithium initiator to be within the range of about 0.05:1 to about 10:1. It is generally more preferred for the molar ratio of the sodium alkoxide to the polar modifier to be within the range about 0.5:1 to about 1:1 and for the molar ratio of the sodium alkoxide to the lithium initiator to be within the range of about 0.2:1 to about 3:1.

In accordance with one embodiment, silicon tetrachloride is charged to the reaction vessel while the living polymers exist but toward the end of the polymerization reaction. By doing so, one selectively couples the diene polymer chains to the silicon as well as the polysiloxane. The amount of silicon tetrachloride can vary, such as an amount equal to 25 percent to 35 percent of the amount of anionic base.

After the polymerization has been completed, the polymerization product, as a diene polymer, will be interpenetrated with the polysiloxane. The diene polymer-polysiloxane can be recovered from the organic solvent and residue by any means, such as decantation, filtration, centrifugation and the like. It is often desirable to precipitate the polymerization product from the organic solvent by the addition of lower alcohols containing from about 1 to about 4 carbon atoms to the polymer solution. Suitable lower alcohols for precipitation of the polymer product from the polymer cement include methanol, ethanol, isopropyl alcohol, normal-propyl alcohol and t-butyl alcohol. The utilization of lower alcohols to precipitate the polymer product from the polymer cement also terminates the living polymer by inactivating lithium end groups. After the polymer network is recovered from the solution, steam-stripping can be employed to reduce the level of volatile organic compounds in the polymer.

The diene polymer-polysiloxane network of the present invention may be used alone or mixed with conventional rubbers or elastomers containing olefinic unsaturation. The phrase "rubber or elastomer containing olefinic unsaturation" is intended to include both natural rubber and its various raw and reclaim forms as well as various synthetic rubbers. In the description of this invention, the terms "rubber" and "elastomer" may be used interchangeably, unless otherwise prescribed. The terms "rubber composition", "compounded rubber" and "rubber compound" are used interchangeably to refer to rubber which has been blended or mixed with various ingredients and materials and such terms are well known to those having skill in the rubber mixing or rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid, α-methyl styrene, paramethyl styrene and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1,4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include silicon-coupled and tin-coupled star-branched polymers. The preferred rubber or elastomers are polybutadiene and SBR.

In one aspect, the rubber to be mixed with the polymer-polysiloxane is mixed with at least two of diene based rubbers. For example, a combination of two or more rubbers may be as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent. When used in a tread compound, the relatively high styrene content of about 30 to about 45 for the E-SBR can be considered beneficial for a purpose of enhancing traction, or skid resistance.

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

When used in a tire tread, 3,4-polyisoprene rubber (3,4-PI) is considered beneficial for the purpose of enhancing the tire's traction. The 3,4PI and use thereof is more fully described in U.S. Pat. No. 5,087,668 which is incorporated herein by reference. The Tg refers to the glass transition temperature which can conveniently be determined by a differential scanning calorimeter at a heating rate of 10° C. per minute.

Additional rubbers which may be mixed with the diene polymer-polysiloxane network are the rubbers coupled with a group IVa metal made by anionic polymerization wherein the polymerization is terminated by the addition of a Group IVa metal coupling agent, such as a tin tetrahalide. The anionic polymerization is initiated with a Group I or II metal, such as lithium, and is carried out for a length of time sufficient to permit substantially complete polymerization of monomers. In other words, the polymerization is normally carried out until high conversions are attained. Then, the coupling agent is added to couple the living rubbery polymer which, of course, terminates the polymerization.

The coupling agent will typically be Group IV a metal halide, such as a tin halide, a lead halide, a germanium halide or a silicon halide. The halogen in the coupling agent will typically be fluorine, chlorine, bromine or iodine. In most cases, the halogen will be selected from the group consisting of fluorine, chlorine and bromine with chlorine being preferred. Tin coupling agents, such as tin tetrachloride, tin tetrabromide, tin tetrachloride and tin tetraiodide are normally preferred. The coupling agent will normally be a tetrahalide. However, trihalides or dihalides can also be used. In cases where tin dihalides are utilized, a linear polymer rather than a branched polymer results. To induce a higher level of branching, tin tetrahalides are normally preferred.

Broadly, and exemplarily, a range of about 0.01 to 4.5 milliequivalents of the coupling agent is employed per 100 grams of the rubbery monomer. It is normally preferred to utilize about 0.01 to about 1.5 milliequivalents of the coupling agent per 100 grams of monomer to obtain the desired Mooney viscosity. The larger quantities tend to result in production of polymers containing terminally reactive groups or insufficient coupling. One equivalent of tin coupling agent per equivalent of lithium is considered an optimum amount for maximum branching. For instance, if a tin tetrahalide is used as the coupling agent, one mole of the tin tetrahalide would be utilized per four moles of live lithium ends. In cases where a tin trihalide is used as the coupling agent, one mole of the tin trihalide will optimally be utilized for every three moles of live lithium ends. The tin coupling agent can be added to a polymer cement containing the living rubbery polymer in a hydrocarbon solution, e.g., in cyclohexane, with suitable mixing for distribution and reaction.

Some representative examples of rubbery polymers which can be asymmetrically tin-coupled include polybutadiene, polyisoprene, styrene-butadiene rubber (SBR), α-methylstyrene-butadiene rubber, α-methylstyrene-isoprene rubber, styrene-isoprene-butadiene rubber (SIBR), styrene-isoprene rubber (SIR), isoprene-butadiene rubber (IBR), α-methylstyrene-isoprene-butadiene rubber and α-methylstyrene-styrene-isoprene-butadiene rubber.

The term "phr" as used herein, and according to conventional practice, refers to "parts by weight of a respective material per 100 parts by weight of rubber, or elastomer."

Even though the diene polymer siloxane-network can be used as the exclusive elastomer, when the above described diene polymer-polysiloxane network is added to the conventional rubbers or elastomers containing olefinic unsaturation, it is done so in an amount of from 5 to 950 parts by weight per 100 parts by weight of elastomer to which the diene polymer-polysiloxane network is being added. Preferably, the polysiloxane network-diene polymer is mixed with the conventional rubber in an amount ranging from 5 to 25 parts by weight per 100 parts by weight of elastomer to which it is added.

In accordance with another embodiment, the amount of diene polymer-polysiloxane network ranges from 800 to 950 parts by weight per 100 parts by weight of elastomer to which the diene polymer-polysiloxane network is being added.

Conventional fillers may be added to the rubber compound and in various amounts. The amount of such conventional fillers may range from 10 to 250 parts by weight per 100 parts by weight of total polymer. Preferably, the filler is present in an amount ranging from 20 to 100 parts by weight per 100 parts by weight of total polymer.

The commonly employed siliceous pigments which may be used in the rubber compound include conventional pyrogenic and precipitated siliceous pigments (silica), although precipitated silicas are preferred. The conventional siliceous pigments preferably employed in this invention are precipitated silicas such as, for example, those obtained by the acidification of a soluble silicate, e.g., sodium silicate.

Such conventional silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, Page 304 (1930).

The conventional silica may also be typically characterized by having a dibutylphthalate (DBP) absorption value in a range of about 100 to about 400, and more usually about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc; silicas available from Rhone-Poulenc, with, for example, designations of Z1165MP and Z165GR and silicas available from Degussa AG with, for example, designations VN2 and VN3, etc.

Commonly employed carbon blacks can be used as a conventional filler. Representative examples of such carbon blacks include N110, N121, N220, N231, N234, N242, N293, N299, S315, N326, N330, M332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP No. ranging from 34 to 150 cm³/100 g.

It is preferred to have the rubber composition additionally contain a conventional sulfur containing organosilicon compound. Examples of suitable sulfur containing organosilicon compounds are of the formula:

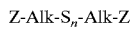 (III)

in which Z is selected from the group consisting of

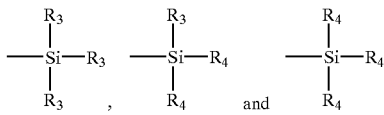

where $R_3$ is an alkyl group of 1 to 4 carbon atoms, cyclohexyl or phenyl; $R_4$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

Specific examples of sulfur containing organosilicon compounds which may be used in accordance with the present invention include: 3,3'-bis(trimethoxysilylpropyl) disulfide, 3,3'-bis(triethoxysilylpropyl)disulfide, 3,3'-bis(triethoxysilylpropyl)tetrasulfide, 3,3'-bis(triethoxysilylpropyl)octasulfide, 3,3'-bis(trimethoxysilylpropyl)tetrasulfide, 2,2'-bis(triethoxysilylethyl)tetrasulfide, 3,3'-bis(trimethoxysilylpropyl)trisulfide, 3,3'-bis(triethoxysilylpropyl)trisulfide, 3,3'-bis(tributoxysilylpropyl)disulfide, 3,3'-bis(trimethoxysilylpropyl)hexasulfide, 3,3'-bis(trimethoxysilylpropyl)octasulfide, 3,3'-bis(trioctoxysilylpropyl)tetrasulfide, 3,3'-bis(trihexoxysilylpropyl)disulfide, 3,3'-bis(tri-2"-ethylhexoxysilylpropyl)trisulfide, 3,3'-bis(triisooctoxysilylpropyl)tetrasulfide, 3,3'-bis(tri-t-butoxysilylpropyl)disulfide, 2,2'-bis(methoxy diethoxy silyl ethyl)tetrasulfide, 2,2'-bis(tripropoxysilylethyl)pentasulfide, 3,3'-bis(tricyclonexoxysilylpropyl)tetrasulfide, 3,3'-bis(tricyclopentoxysilylpropyl)trisulfide, 2,2'-bis(tri-2"-methylcyclohexoxysilylethyl)tetrasulfide, bis(trimethoxysilylmethyl)tetrasulfide, 3-methoxy ethoxy propoxysilyl 3'-diethoxybutoxy-silylpropyltetrasulfide, 2,2'-bis(dimethyl methoxysilylethyl)disulfide, 2,2'-bis(dimethyl sec.butoxysilylethyl)trisulfide, 3,3'-bis(methyl butylethoxysilylpropyl)tetrasulfide, 3,3'-bis(di t-butylmethoxysilylpropyl)tetrasulfide, 2,2'-bis(phenyl methyl methoxysilylethyl)trisulfide, 3,3'-bis(diphenyl isopropoxysilylpropyl)tetrasulfide, 3,3'-bis(diphenyl cyclohexoxysilylpropyl)disulfide, 3,3'-bis(dimethyl ethylmercaptosilylpropyl)tetrasulfide, 2,2'-bis(methyl dimethoxysilylethyl)trisulfide, 2,2'-bis(methyl ethoxypropoxysilylethyl)tetrasulfide, 3,3'-bis(diethyl methoxysilylpropyl)tetrasulfide, 3,3'-bis(ethyl di-sec. butoxysilylpropyl)disulfide, 3,3'-bis(propyl diethoxysilylpropyl)disulfide, 3,3'-bis(butyl dimethoxysilylpropyl)trisulfide, 3,3'-bis(phenyl dimethoxysilylpropyl)tetrasulfide, 3-phenyl ethoxybutoxysilyl 3'-trimethoxysilylpropyl tetrasulfide, 4,4'-bis(trimethoxysilylbutyl)tetrasulfide, 6,6'-bis(triethoxysilylhexyl)tetrasulfide, 12,12'-bis(triisopropoxysilyl dodecyl)disulfide, 18,18'-bis(trimethoxysilyloctadecyl)tetrasulfide, 18,18'-bis(tripropoxysilyloctadecenyl)tetrasulfide, 4,4'-bis(trimethoxysilyl-buten-2-yl)tetrasulfide, 4,4'-bis(trimethoxysilylcyclohexylene)tetrasulfide, 5,5'-bis(dimethoxymethylsilylpentyl)trisulfide, 3,3'-bis(trimethoxysilyl-2-methylpropyl)tetrasulfide, 3,3'-bis(dimethoxyphenylsilyl-2-methylpropyl)disulfide.

The preferred sulfur containing organosilicon compounds are the 3,3'-bis(trimethoxy or triethoxy silylpropyl)sulfides. The most preferred compounds are 3,3'-bis(triethoxysilylpropyl)disulfide and 3,3'-bis(triethoxysilylpropyl)tetrasulfide. Therefore as to formula III, preferably Z is

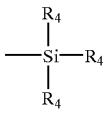

where $R_4$ is an alkoxy of 2 to 4 carbon atoms, with 2 carbon atoms being particularly preferred; alk is a divalent hydrocarbon of 2 to 4 carbon atoms with 3 carbon atoms being particularly preferred; and n is an integer of from 2 to 5 with 2 and 4 being particularly preferred.

The amount of the sulfur containing organosilicon compound of Formula III in a rubber composition will vary depending on the level of other additives that are used. Generally speaking, the amount of the compound of formula III will range from 0.5 to 20 phr. Preferably, the amount will range from 1 to 10 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. Preferably, the sulfur vulcanizing agent is elemental sulfur. The sulfur vulcanizing agent may be used in an amount ranging from 0.5 to 8 phr, with a range of from 1.5 to 6 phr being preferred. Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, naphthenic, and/or paraffinic processing oils. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

In one aspect of the present invention, the diene polymer-polysiloxane network is sulfur-cured or vulcanized.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, preferably about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The mixing of the diene polymer-polysiloxane network with the conventional rubber additives described above can be accomplished by methods known to those having skill in the rubber mixing art. For example the ingredients are typically mixed in at least two stages, namely at least one non-productive stage followed by a productive mix stage. The final curatives including sulfur vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The rubber and polysiloxane network-diene polymers are mixed in one or more non-productive mix stages. The terms "non-productive" and "productive" mix stages are well known to those having skill in the rubber mixing art. The polysiloxane network-diene polymer may be added as a separate ingredient or in the form of a masterbatch. The rubber composition containing the diene polymer-polysiloxane network as well as the optional sulfur-containing organosilicon compound may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions and the volume and nature of the components. For example, the thermomechanical working may be from 1 to 20 minutes.

Vulcanization of the rubber composition of the present invention is generally carried out at conventional temperatures ranging from about 100° C. to 200° C. Preferably, the vulcanization is conducted at temperatures ranging from about 110° C. to 180° C. Any of the usual vulcanization processes may be used such as heating in a press or mold, heating with superheated steam or hot air or in a salt bath.

Upon vulcanization of the sulfur vulcanized composition, the rubber composition of this invention can be used for various purposes. For example, the sulfur vulcanized rubber composition may be in the form of a tire, belt or hose. In case of a tire, it can be used for various tire components. Such tires can be built, shaped, molded and cured by various methods which are known and will be readily apparent to those having skill in such art. Preferably, the rubber composition is used in a sidewall and/or the tread of a tire. As can be appreciated, the tire may be a passenger tire, aircraft tire, truck tire and the like. Preferably, the tire is a passenger tire. The tire may also be a radial or bias, with a radial tire being preferred.

While certain representative embodiments and details have been shown for the purpose of illustrating the invention, it will be apparent to those skilled in this art that various changes and modifications may be made therein without departing from the spirit or scope of the invention.

What is claimed is:

1. The method for the preparation of a diene polymer interpenetrated with a polysiloxane comprising the polymerization of (A) at least one silane monomer of the formula:

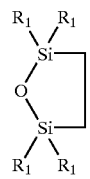

I (B) at least one silane monomer of the formula:

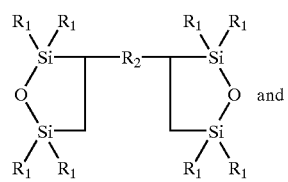 and

II (C) at least one diene monomer, said polymerization being conducted in the presence of an anionic base, an inert solvent and a polymerization initiator, wherein each $R_1$ is independently selected from the group consisting of alkyl radicals having from 1 to 4 carbon atoms and aryl radicals having 6 carbon atoms and $R_2$ is selected from the group consisting of

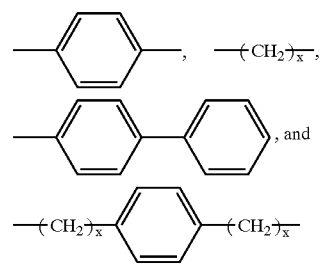

where x is an integer of from 1 to 8.

2. The method of claim 1 wherein the diene monomer is selected from the group consisting of butadiene, methylbutadiene, α-methyl styrene, paramethyl styrene, dimethylbutadiene, pentadiene, styrene, isoprene and mixtures thereof.

3. The method of claim 1 wherein said anionic base is selected from the group consisting of organolithium compounds, tetrabutylammonium hydroxide, potassium phenoxide, sodium hydrogen sulfide, tertiary butoxide and potassium tertiary butoxide.

4. The method of claim 1 wherein said inert solvent is selected from the group consisting of aliphatic, alicyclic and aromatic hydrocarbons.

5. The method of claim 4 wherein said solvent is selected from the group consisting of pentane, hexane, heptane, isooctane, cyclohexane, benzene, toluene and xylene.

6. The method of claim 1 wherein said polymerization initiator is a monofunctional or polyfunctional anionic initiator or monanionic initiator.

7. The method of claim 1 wherein said polymerization initiator is an alkaline metal compound or alkaline-earth metal compound.

8. The method of claim 7 wherein said alkaline metal compound is an organolithium compound selected from the group consisting of ethyllithium, n-butyllithium, isobutyllithium and dilithium polymethylenes.

9. The method of claim 1 wherein said polymerization is conducted at a temperature of between 20° C. and 120° C.

10. A compound containing a diene polymer interpenetrated with a polysiloxane polymer characterized by being prepared by the method of claim 1.

11. A composition comprising a mixture of (A) from 5 to 950 phr of the compound of claim 10 having an interpenetrating network of a diene polymer and a polysiloxane; and (B) 100 parts by weight of at least one rubber containing olefinic unsaturation.

12. The composition of claim 11 wherein said rubber is selected from the group consisting of natural rubber, neoprene, polyisoprene, butyl rubber, halobutyl rubber, polybutadiene, styrene-butadiene copolymer, styrene/isoprene/butadiene rubber, methyl methacrylate-butadiene copolymer, isoprene-styrene copolymer, methyl methacrylate-isoprene copolymer, acrylonitrile-isoprene copolymer, acrylonitrile-butadiene copolymer, EPDM, silicon-coupled star-branched polymers, tin-coupled star-branched polymers and mixtures thereof.

13. The composition of claim 11 wherein from 0.5 to 20 phr of a sulfur containing organosilicon compound is present and is of the formula:

in which Z is selected from the group consisting of

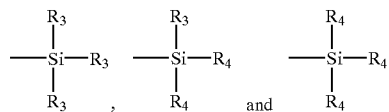

where $R_3$ is an alkyl group of 1 to 4 carbon atoms, cyclohexyl or phenyl; $R_4$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

14. The composition of claim 13 wherein said composition is thermomechanically mixed at a rubber temperature in a range of from 140° C. to 190° C. for a total mixing time of from 1 to 20 minutes.

15. A sulfur vulcanized rubber composition which is prepared by heating the composition of claim 11 to a temperature ranging from 100° C. to 200° C. in the presence of a sulfur vulcanizing agent.

16. The rubber composition of claim 15 in the form of a tire, belt or hose.

17. A tire having a tread comprised of the composition of claim 15.

* * * * *